(12) United States Patent
Vallinen et al.

(10) Patent No.: US 8,086,545 B2
(45) Date of Patent: *Dec. 27, 2011

(54) CHARGING IN A COMMUNICATION SYSTEM

(75) Inventors: Juha Vallinen, Nokia (FI); Juha-Pekka Koskinen, Hameenlinna (FI)

(73) Assignee: Intellectual Ventures I LLC, Wilmington, DE (US)

( * ) Notice: Subject to any disclaimer, the term of this patent is extended or adjusted under 35 U.S.C. 154(b) by 139 days.

This patent is subject to a terminal disclaimer.

(21) Appl. No.: 12/427,990

(22) Filed: Apr. 22, 2009

(65) Prior Publication Data

US 2009/0203353 A1    Aug. 13, 2009

Related U.S. Application Data

(63) Continuation of application No. 10/976,895, filed on Nov. 1, 2004.

(30) Foreign Application Priority Data

Jun. 30, 2004   (GB) .................................. 0414662.7

(51) Int. Cl.
*G06Q 99/00* (2006.01)

(52) U.S. Cl. ......... 705/400; 455/406; 455/407; 455/408

(58) Field of Classification Search .............. 705/7, 400; 455/406–408
See application file for complete search history.

(56) References Cited

U.S. PATENT DOCUMENTS

| 6,577,719 | B2 | 6/2003 | Simonen et al. | |
| 7,221,929 | B2 | 5/2007 | Lee et al. | |
| 2002/0068545 | A1* | 6/2002 | Oyama et al. | 455/406 |
| 2003/0114140 | A1* | 6/2003 | Iivonen et al. | 455/406 |
| 2004/0101117 | A1 | 5/2004 | Koskinen et al. | |
| 2004/0229596 | A1 | 11/2004 | Stura et al. | |
| 2004/0235505 | A1* | 11/2004 | Lee | 455/466 |
| 2004/0252640 | A1 | 12/2004 | Focke | |
| 2005/0026558 | A1 | 2/2005 | Stura et al. | |

FOREIGN PATENT DOCUMENTS

EP    779733 A2 *  6/1997

OTHER PUBLICATIONS

Garcia-Martin et al., "Multiple recipient MESSAGE requests in the Session Initiation Protocol (SIP)," SIPPING Working Group Internet-Draft, May 11, 2004, 10 pages.*
Garcia-Martin et al., "Multiple recipient MESSAGE requests in the Session Initiation Protocol (SIP)," SIPPING Working Group Internet-Draft, May 11, 2004, 10 pages.*

(Continued)

*Primary Examiner* — Akiba Robinson Boyce (57) ABSTRACT

A method and a system for determining a charge for a communication in a communications network is provided. A message is received from a user equipment. The message comprises a payload and is addressed to a plurality of destinations. A first message is sent towards a destination of the plurality of destinations. The first message comprises the payload, a first charging identifier, and a second charging identifier. The first charging identifier is associated with the message and the second charging identifier is generated for the destination. A charging message is sent to a network node to charge an account of the user equipment. The charging message comprises the first charging identifier and the second charging identifier.

21 Claims, 5 Drawing Sheets

OTHER PUBLICATIONS

Martin et al., "Multiple recipient MESSAGE requests in the Session Initiation Protocol (SIP)," SIPPING Working Group Internet-Draft, May 11, 2004, 10 pages.

International Search Report and Written Opinion for PCT/IB2005/001994 sent Oct. 12, 2005.

International Preliminary Report on Patentability for PCT/IB2005/001994 issued Jan. 9, 2007.

Notice of Allowance on U.S. Appl. No. 10/976,895, mailed Jul. 21, 2011.

* cited by examiner

CHARGING IN A COMMUNICATION SYSTEM

CROSS-REFERENCE TO RELATED APPLICATIONS

This application is a continuation of U.S. patent application Ser. No. 10/976,895 that was filed Nov. 1, 2004, the disclosure of which is incorporated by reference in its entirety. U.S. patent application Ser. No. 10/976,895 claims priority under the Paris Convention to Great Britain application 0414662.7, filed Jun. 30, 2004, the disclosure of which is incorporated by reference in its entirety.

BACKGROUND

In a basic communication system a simple communication network is provided, which can link together two communication terminals so that the terminals can communicate with each other in a communication session or call. Conventionally, a designated entity in the network uses a stored tariff to determine a charge for a call based on the call's duration, or for a service based on the service provided. Each terminal user has a charging account with the operator of the network. The charge for a call is then allocated to the charging account of the user of the terminal that originated the call.

The 3G Partnership Project (3GPP) is defining a reference architecture for the Universal Mobile Telecommunication System (UMTS) core network which will provide the users of user equipment (UE) with access to various services. This UMTS core network is divided into three principal domains. These are the Circuit Switched domain, the Packet Switched domain and the Internet Protocol Multimedia Subsystem (IMS) domain.

The IMS network makes sure that multimedia services are adequately managed. The IMS network supports the Session Initiation Protocol (SIP) as developed by the Internet Engineering Task Force (IETF). SIP is an application layer signaling protocol for starting, charging and ending user sessions. A session may, for example, be a two-way telephone call or a connection between a user and an application server (AS). The establishment of these sessions enables a user to be provided with services. One of the basic features of SIP is that the protocol enables personal mobility of a user using mobile UE by providing the capability to reach a called party (which can be an application server AS) via a single location independent address.

For third generation (3G) communication systems, the systems of more than one operator may be used for carrying a call and operators of all of those systems may be able to levy charges independently for the services they provide in supporting the call. In an IMS network, charging functionality is based on the IMS network nodes reporting accounting information in messages that include an IMS charging identity (ICID). The ICID provides a unique identifier for each call, which enables charges for a single call to be made to the correct account by a number of operators. Accordingly, current charging functionality employing the use of ICID only relates to charging for a single call or connection.

It is possible however, for a user to simultaneously establish communication with more than one destination. For example, using the explode mechanism, it is possible for a user to send a message to a plurality of destinations. An explode indication could be inserted to various SIP methods (e.g. MESSAGE). To send a SIP message to multiple destinations, the SIP message includes a URI (Universal Resource Indicator) list specifying the destinations. A Request-URI of the message contains a 'list' parameter that points to the part of the message that carries the URI list. A specialized application server receives the request and sends a similar message to each of the URIs in the list. Each of these messages contains a copy of the payload included in the original message.

There is currently no feasible solution for efficiently managing charging for a session including use of a plurality of resources based on the use of ICIDs. The present invention aims to provide such a solution. A further aim of the present invention is to provide a way of managing charging when a plurality of different messages are generated in a single session.

BRIEF DESCRIPTION OF THE DRAWINGS

Embodiments will now be described by way of example only with reference to the accompanying drawings, in which.

DETAILED DESCRIPTION

Reference is first made to a cellular telecommunication system in which embodiments of the present invention may be implemented, however the present invention is not limited to use in a cellular system. In a cellular system, base stations of the cellular system provide radio coverage areas, i.e. cells. Each radio coverage area is typically served by a base station. It should be appreciated that one cell may include more than one base station site. A base station apparatus or site may also provide more than one cell. The shape and size of the cells depend on the implementation. It should be appreciated that in some systems the base station may be referred to as Node B.

It shall be appreciated that typically a number of user equipment will be in communication with each base station. Each base station is arranged to transmit signals to and receive signals from the mobile user equipment (UE) via a wireless interface. Likewise, each UE is able to transmit signals to and receive signals from the base station.

Figure 1:
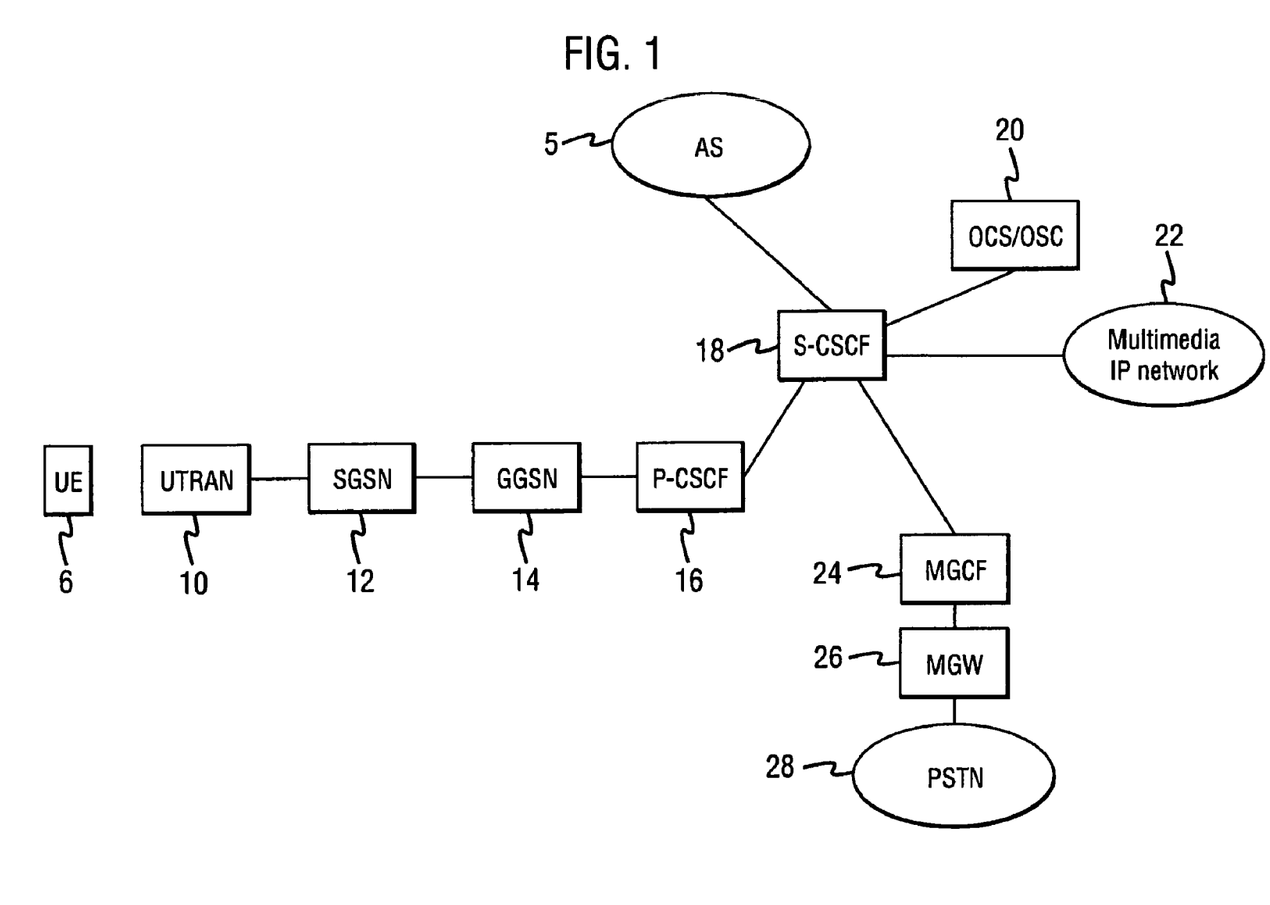
FIG. 1 is a schematic diagram of a communication network.

Each of the base stations is connected to an access network controller such as a radio network controller of a UMTS terrestrial radio access network (UTRAN) 10, as shown in FIG. 1. The radio network controller may be connected to appropriate core network entities of the cellular system, such as an SGSN 12 (serving general packet radio service support node) for packet switched communication and additionally an MSC (mobile switching centre) for circuit switched communication.

FIG. 1 depicts the architecture of a UMTS IMS network. In the system of FIG. 1, the UE 6 can communicate with the IMS network via radio interface. By this means, the UE can communicate with other UEs that are connected directly to the IMS network or are connected to other networks that are connected to the IMS network. The UEs can also receive applications and services from application server (AS) 5.

The core network section of the network includes an SGSN (serving GPRS support node) 12, a GGSN (gateway support node) 14, a P-CSCF (Proxy Call State Control Function) 16, and an S-CSCF (Serving Call State Control Function) 18. In addition, the network has an OCS (Online Charging System) 20, such as the Online Service Controller (OSC) provided by Nokia. The OCS is responsible for collecting data on charges for the subscriber of the UE of the network. Each network may include a number of OCSs each of which serves a subset of subscribers to that network.

As shown in FIG. 1, the S-CSCF 18 is connected directly to the Multimedia IP Network 22. The S-CSCF may also be connected to the PSTN 28 via the MGCF (Media Gateway Control Function) 24, and MGW (Media Gateway) 26.

Operators may choose to offer prepaid and/or postpaid services. For prepaid services, on-line charging is used. On-line charging is a process where a subscriber's account is debited in real time when a service is requested. Conversely, for postpaid services a subscriber's account is debited after the service has been provided to the subscriber, using off line charging methods.

Figure 2:
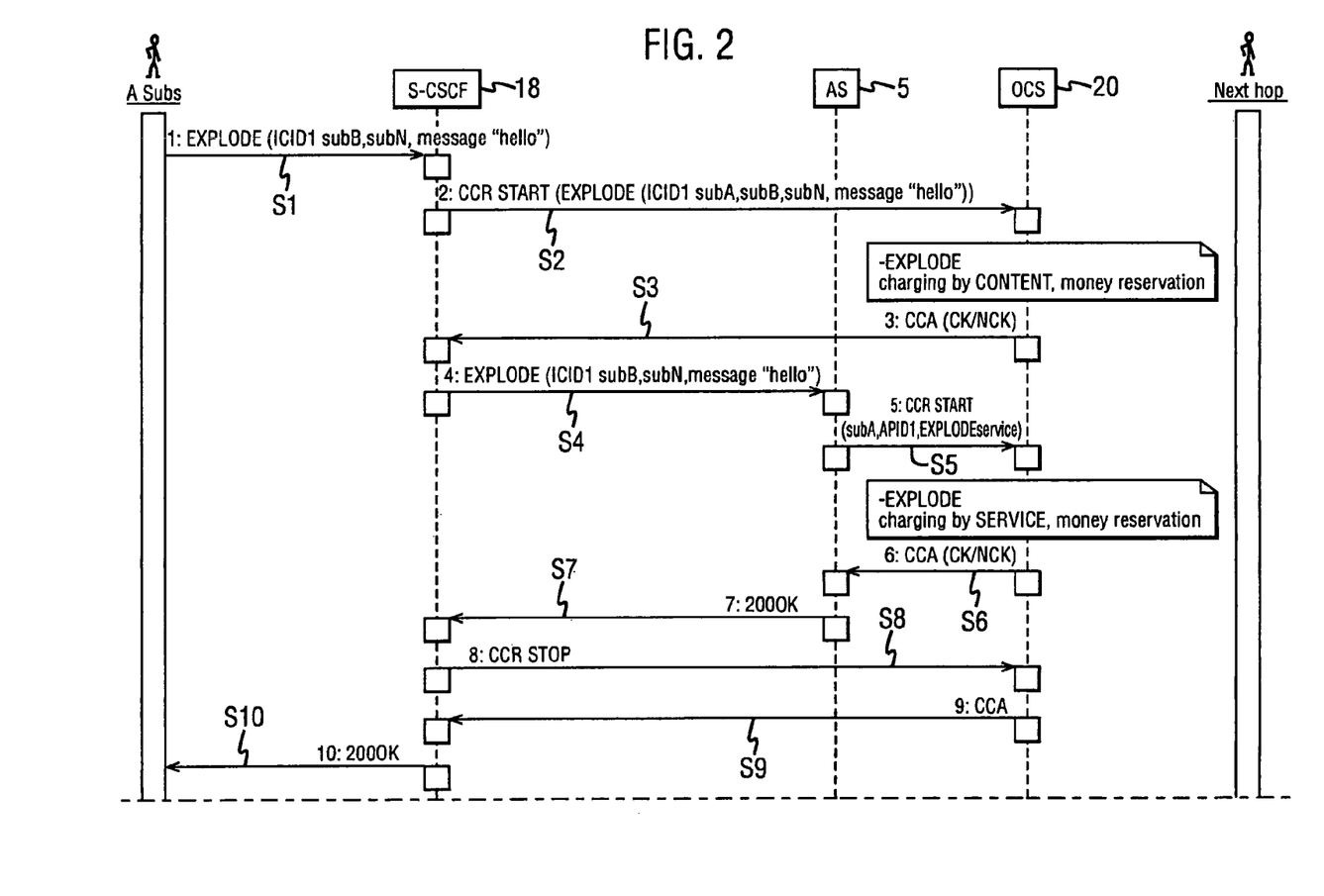
FIG. 2 is a signaling diagram showing steps of a method in accordance with an embodiment.

An embodiment will first be discussed in relation to prepaid services. In order to use the services of the communications system with a prepaid SIM card for example, the associated prepaid account must be have credit in advance of using the services. FIG. 2 shows a signaling diagram showing steps of a method in accordance with an embodiment of the present invention.

In step S1 a SIP message, hereinafter referred to as the incoming SIP message, is sent from the UE of a subscriber A over the IMS network via P-CSCF 16 to S-CSCF 18. The incoming SIP message will include a first charging identity ICID1 which is inserted by the P-CSCF16, a subscriber ID, e.g. the MSIDN (Mobile Station IDSN Number) and a special message body. The incoming SIP message body includes: information that indicates that a SIP message should be sent—this is provided by the presence of a 'list' parameter included in a Request URI in the message; the payload of the SIP message, e.g. 'hello', and a URI list listing the destinations of where to send the SIP message.

Steps 2 and 3 carry out SIP credit reservation in the known manner. In step S2, the S-CSCF sends a Credit Control Request (CCR) message to the OCS 20, containing the first charging identity ICID1. This message starts a credit control session in the OCS. The message will also contain information relating to the incoming SIP message payload and the identity of the subscriber. The message may also contain the list of destinations of the SIP message. The credit control session started in step 2 relates to charging for the transmitting of a message with the payload of the SIP message, regardless of the SIP method used. The S-CSCF 18 may access a Home Subscriber Server (HSS) (not shown) to determine the identity of the OCS 20 associated with the subscriber of UE 6.

In step S3, the OCS 20 will check that the subscriber of the user equipment has sufficient credit in their account to send the message. The OCS will then send a Credit Control Answer (CCA) message to the S-CSCF 18 confirming whether or not there is sufficient credit in the subscriber's account.

If it is determined that there is sufficient credit in the subscriber's account, in step 54, the incoming SIP message is forwarded from the S-CSCF 18 to AS 5 which will later perform the actual EXPLODE service. On receipt of the incoming SIP message, the AS generates APID1 (Application service specific ID) for correlation purposes.

In step S5, the AS 5 sends a CCR message to the OCS 20, containing both the application service specific ID APID1, the first charging ID ICID1, and the subscriber ID. This message starts a credit reservation session for the EXPLODE service identified by the APID1. The credit reservation made in step 2 only relates to charging for the EXPLODE service.

In step S6, the OCS 20 will check that the subscriber of the user equipment has sufficient credit in their account to pay for the EXPLODE service. The OCS will then send a CCA message to the AS 5 confirming whether or not there is sufficient credit in the subscriber's account.

If the EXPLODE service is charged using an event based method, the subscriber's account is also debited during step 6.

If it is determined that there is sufficient credit in the subscriber's account, in step S7, the AS sends a message 200OK to S-CSCF confirming that there is sufficient credit in the subscriber's account and that the EXPLODE service will be carried out. The APID, ICID1 and subscriber ID are included in the 200OK message.

Upon receiving confirmation in step 8, the S-CSCF sends a message CCR STOP instructing the OCS to close the credit control session started in step 2 and to debit the subscriber's account for transmitting the incoming SIP message.

In step 9, the OCS sends a message to the S-CSCF indicating that the subscriber's account has been debited.

Upon receiving the message confirming that the subscriber's account has been debited in respect of transmitting the incoming SIP in step 10 the SCSCF forwards 200OK message to the subscriber via P-CSCF 16, indicating that the EXPLODE service will be performed.

In step S11 the AS performs the EXPLODE service by creating the SIP messages according to the instructions included in the incoming SIP message. The SIP messages created by the AS according to the instructions included in the incoming SIP message shall hereinafter be referred to as outgoing SIP messages. The AS will create as many outgoing SIP messages as there are destinations in the URI list. Each outgoing SIP message should include a copy of the payload of the incoming SIP message which may include text messages, images, etc. The Request URI of each of the outgoing SIP messages will not include any list parameters, however, a copy the URI list may be provided in the outgoing SIP message.

The same application ID, APID1, is inserted into each outgoing SIP message. In addition to containing a common application ID, APID1, each outgoing SIP message is given a different ICID value. The AS generates a different charging ID for each outgoing SIP message, these shall be referred to as ICID2, ICID3, ICID4 . . . up to ICID(n+1) for the final, nth, outgoing SIP message to be sent according to the incoming SIP message. The destination of each outgoing SIP message is read from the URI list included in the incoming SIP message. The destination of each outgoing SIP message is also included in the message before each outgoing SIP message is forwarded to the S-CSCF which will later route the messages towards the destinations. The AS will continue to send each outgoing SIP message to the S-CSCF until, in step S12, the nth outgoing SIP message is sent to the S-CSCF.

In step s13, the S-CSCF 18 sends a CCR message to the OCS 20, in order to start a credit reservation session for the transmission of the first outgoing SIP message to be sent to the destination specified in the incoming SIP message. The request contains the APID1, the ICID of the first outgoing SIP message ICID2, and the identity of the subscriber.

In step S14, the OCS 20 will check that the subscriber of the user equipment has sufficient credit in their account to pay for the transmission of the first SIP message. The OCS will then send a CCA message to the S-CSCF 18 confirming whether or not there is sufficient credit in the subscriber's account.

On receipt of confirmation in step S14, in step S15, the first outgoing SIP message which includes charging ID ICID2 and application ID APID1 is sent from the S-CSCF towards the destination defined in the incoming SIP message.

In step s16, the S-CSCF 18 sends a CCR message to the OCS 20, in order to start a credit control session for the transmission of the second outgoing SIP message to be sent to the destination specified in the incoming SIP message. The request contains APID1, the charging ID of the second outgoing SIP message ICID3 and the subscriber ID.

In step S17, the OCS 20 will check that the subscriber of the user equipment has sufficient credit in their account to pay for the transmission of the second outgoing SIP message. The OCS will then send a CCA message to the S-CSCF 18 confirming whether or not there is sufficient credit in the subscriber's account.

On receipt of confirmation in step S17, in step S18, the second outgoing SIP message, which includes charging ID ICID3 and application ID APID1, is sent from the S-CSCF towards the destination defined in the incoming SIP message.

The S-CSCF continues to reserve credit and route the remaining outgoing SIP messages to the destinations specified in the incoming SIP message until all of the outgoing SIP messages are sent or until the subscriber no longer has sufficient credit to route further outgoing SIP messages.

At step S19, a 200OK message is sent from the next hop to receive the first outgoing SIP message, to the S-CSCF confirming that it has received the message. In FIG. 2, the next hop is the next node that routes the message towards the destination, however, in an alternative embodiment of the invention confirmation could be provided by the destination.

Upon receiving confirmation, in step S20, the S-CSCF sends a message CCR STOP including the application ID APID1, the charging ID ICID2, and the subscriber ID, instructing the OCS to debit the subscriber's account for transmission of the first outgoing SIP message.

In step S21, the OCS sends a CCA message to the S-CSCF indicating that the subscriber's account has been debited.

Upon receiving the CCA message confirming that the subscriber's account has been debited in respect of transmitting the first outgoing SIP message, in step S22, the S-CSCF forwards the 200OK message including the APID1 and ICID2 to the AS 5, indicating that the first outgoing SIP message has been successfully routed towards the destination.

At step S23, a 200OK message is sent from the next hop to receive the second SIP message, to the S-CSCF confirming that it has received the message. Again, the 200OK message includes the APID1 and the charging ID of the second outgoing SIP message ICID3.

Upon receiving confirmation, in step S24, the S-CSCF sends a message CCR STOP including the application ID APID1, the charging ID ICID3, and the subscriber ID instructing the OCS to debit the subscriber's account for transmission of the second SIP message.

In step S25, the OCS sends a message to the S-CSCF indicating that the subscriber's account has been debited.

Upon receiving the message confirming that the subscriber's account has been debited in respect of transmitting the second SIP message, in step 26, the S-CSCF sends a 200OK message including the APID1 and ICID3 to the AS 5.

The process as defined in steps S23 to S26 is repeated in relation to the remaining outgoing SIP messages sent according to the incoming SIP message.

In accordance with one embodiment of the present invention, the OCS identifies each CCR including the same application ID APID1. Although the S-CSCF sends separate CCR STOP messages to the OCS for each outgoing SIP message, the OCS may then adjust the amount debited from the subscriber's account in accordance with network operator pricing plans. For example, the number of successfully transmitted messages may affect the actual price of the service.

Since the 200OK message sent in respect of each outgoing SIP message includes the application ID APID1, the AS is able to associate each 200OK message received with the EXPLODE service that generated each outgoing SIP message. In this case information relating to the EXPLODE service, for example the number of outgoing SIP messages generated, is stored together with the application ID, APID1 in the AS. The AS is therefore able to determine whether the number of 200OK messages including the application ID APID1 is equal to the number of outgoing SIP messages generated by the associated EXPLODE service. This information may be stored until the AS determines that all of the outgoing SIP messages have been sent, or until step S28 described hereinafter.

Accordingly, when the AS receives the 200OK message confirming transmission of the final SIP message which includes APID1 and the ICID for that outgoing SIP message, the AS may determine that the EXPLODE service is complete. It is noted that the 200OK messages relating to successful transmission of each outgoing SIP message may be received in any order, for example, the 200OK message including ICID2 may be received after the 200OK message which includes ICID4. If the AS does not receive a 200OK message for each outgoing SIP message after a predetermined time, the network operator may configure the AS to take appropriate action, for example to resend the messages.

In an alternative embodiment to receiving the 200OK message at step 22, the AS may be configured to receive any appropriate confirmation of successful transmission of each SIP message from the node which receives each outgoing SIP message. This may be any appropriate final or other response.

In an alternative embodiment of the present invention the payment for the EXPLODE service paid for after the SIP messages are successfully routed to their destination and steps S8 and S9 are not carried out. Instead, the subscriber's account is debited in steps S27-S28, as set out below.

In step S27, on receipt of the 200OK message relating to the final SIP message indicating that the EXPLODE service is complete, the AS 5 sends a message CCR STOP including the APID1 instructing the OCS to debit the subscriber's account for the EXPLODE service.

In step S28, the OCS sends a message to the AS indicating that the subscriber's account has been debited.

Figure 3:
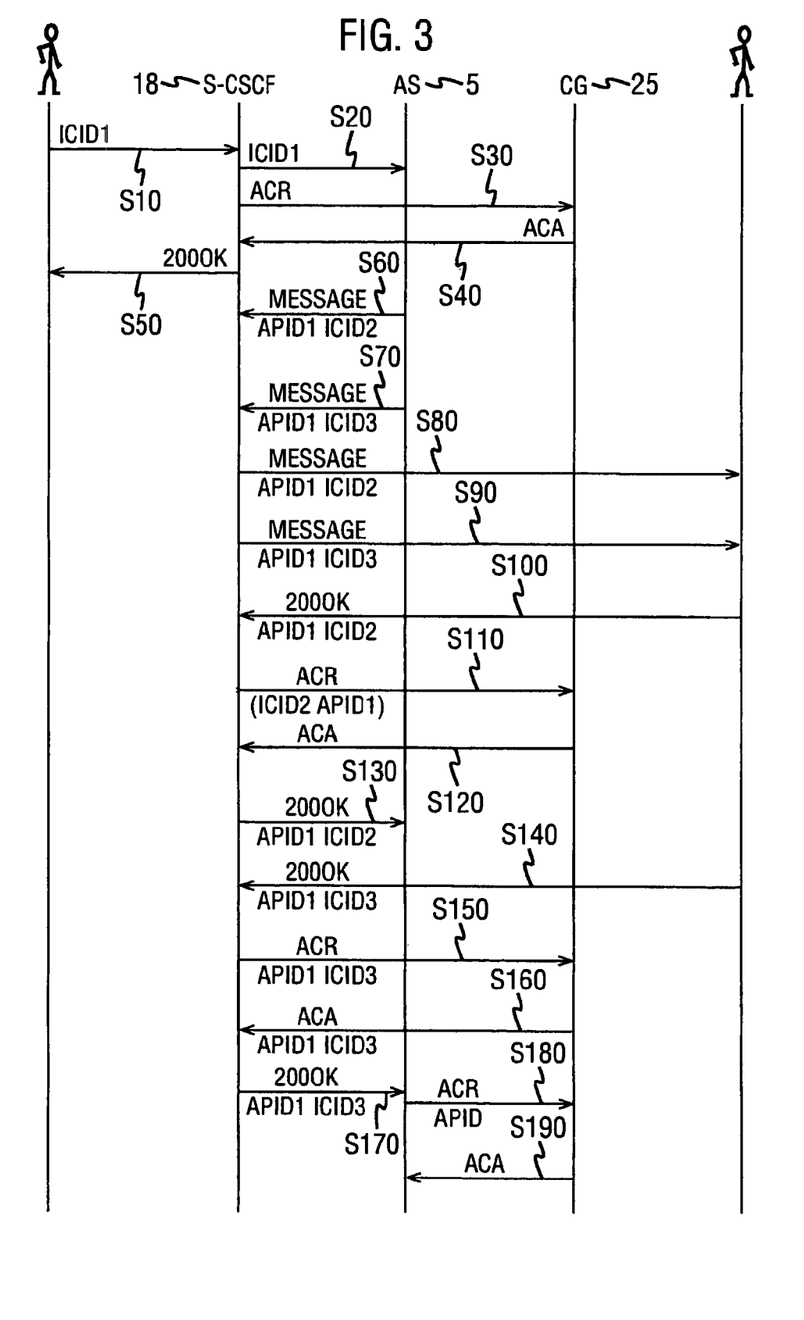
FIG. 3 is a signaling diagram showing steps of a method in accordance with an alternative embodiment.

In an alternative embodiment of the present invention, postpaid charging is used. In this case, the user may have a contract with the network operator by which the user may pay for a service after they have used the service. FIG. 3 shows a signaling diagram in accordance with an embodiment of the present invention when postpaid charging is used.

In FIG. 3, the OCS 20 referred to in FIG. 2 is replaced by a CG (Charging Gateway) 25. The remaining elements of the arrangement shown in FIG. 3 are the same as those described in relation to FIG. 2 and are referred to with like reference numerals.

In step S10, a SIP message, hereinafter referred to as the incoming SIP message, is sent from the UE of a subscriber A over the IMS network via P-CSCF 16 to S-CSCF 18. The incoming SIP message will include a first charging identity ICID1 which is inserted by the P-CSCF 16, a subscriber ID, and a message body. The incoming SIP message body includes: information that indicates that a SIP message should be sent—as described above this is provided by the presence of a 'list' parameter included in a Request URI in the message; the payload of the SIP message, e.g. 'hello'; and a URI list, listing the destinations of where to send the SIP message.

In step S20 the incoming SIP message is forwarded from the S-CSCF 18 to AS 5 which will later perform the actual EXPLODE service. On receipt of the incoming SIP message the AS generates APID1 (Application service specific ID) for correlation purposes.

In step S30, the S-CSCF sends a message ACR (Accounting Request) instructing the CG to charge the subscriber's account for transmitting the incoming SIP message to the AS.

In step S40, the CG sends an ACA (Accounting Answer) message to the S-CSCF indicating that the subscriber's account will be charged.

Upon receiving the message confirming that the subscriber's account will be charged in respect of transmitting the incoming SIP message, in step S50, the S-CSCF forwards a 200OK message to the subscriber via P-CSCF 16, indicating that the EXPLODE service will be performed.

In step S60, the AS performs the EXPLODE service by creating the SIP messages according to the instructions included in the incoming SIP message. The SIP messages created by the AS according to the instructions included in the incoming SIP message shall hereinafter be referred to as outgoing SIP messages. The AS will create as many outgoing SIP messages as there are destinations in the URI list. Each outgoing SIP message should include a copy of the payload of the incoming SIP message which may include text messages, images, etc. The Request URI of each of the outgoing SIP message will not include any list parameters, however a copy the URI list may be provided in the outgoing SIP message.

The same application ID, APID1, is inserted into each outgoing SIP message. In addition to containing a common application ID, APID1, each outgoing SIP message is given a different ICID value. The AS generates a different charging ID for each outgoing SIP message, these shall be referred to as ICID2, ICID3, ICID4 ... up to ICID(n+1) for the final, nth, outgoing SIP message to be sent according to the incoming SIP message. The destination of each outgoing SIP message is read from the URI list included in the incoming SIP message. The destination of each outgoing SIP message is also included in the message before each outgoing SIP message is forwarded to the S-CSCF which will later route the messages towards the destinations. The AS will continue to send each outgoing SIP message to the S-SCF until in step S70 the nth outgoing SIP message is sent to the S-CSCF.

In step S80, the first outgoing SIP message which includes charging ID ICID2 and application ID APID1 is sent from the S-CSCF towards the destination defined in the incoming SIP message.

In step S90, the second outgoing SIP message which includes charging ID ICID3 and application ID APID1 is sent from the S-CSCF towards the destination defined in the incoming SIP message.

The S-CSCF continues to route the remaining outgoing SIP messages to the destinations specified in the incoming SIP message until all the SIP messages are sent.

At step S100, a 200OK message is sent from the next hop to receive the first outgoing SIP message, to the S-CSCF confirming that it has received the message. In FIG. 3, the next hop is the next node that routes the message towards the destination, however, in an alternative embodiment, confirmation could be provided by the destination.

Upon receiving confirmation, in step S110, the S-CSCF sends an ACR (Accounting Request) message including the application ID APID1, the charging ID ICID2, and the subscriber ID, instructing the CG to charge the subscriber's account for transmission of the first outgoing SIP message.

In step S120, the CG sends an ACA message to the S-CSCF indicating that the subscriber's account will be charged for transmission of the first outgoing SIP message.

Upon receiving the ACA message confirming that the subscriber's account has been charged in respect of transmitting the first outgoing SIP message, in step S130, the S-CSCF forwards the 200OK message including the APID1 and ICID2 to the AS 5, indicating that the first outgoing SIP message has been successfully routed towards the destination.

At step S140, a 200OK message is sent from the next hop to receive the second outgoing SIP message, to the S-CSCF confirming that it has received the message. Again the 200OK message includes the APID1 and the charging ID of the second outgoing SIP message ICID3.

Upon receiving confirmation, in step S150, the S-CSCF sends a message ACR including the application ID APID1, the charging ID ICID3, and the subscriber ID instructing the CG to charge the subscriber's account for transmission of the second outgoing SIP message.

In step S160, the CG sends a message to the S-CSCF indicating that the subscriber's account will be charged.

Upon receiving the message confirming that the subscriber's account will be charged in respect of transmitting the second SIP message, in step S170, the S-CSCF sends a 200OK message including the APID1 and ICID3 to the AS 5.

The process as defined in steps S140 to S170 is repeated in relation to the remaining outgoing SIP messages sent according to the incoming SIP message.

In step S180, on receipt of the 200OK message relating to the nth outgoing SIP message indicating that the EXPLODE service is complete, the AS 5 sends a ACR message including the APID1 instructing the CG to charge the subscriber's account for the EXPLODE service.

In step S190, the CG sends a message to the AS indicating that the subscriber's account has been charged in respect of the EXPLODE service.

In accordance with one embodiment of the present invention, the CG identifies each ACR including the same application ID APID1. Although the S-CSCF sends separate ACR messages to the CG for each outgoing SIP message, the CG may then adjust the amount charged to the subscriber's account in accordance with network operator pricing plans. For example, the number of successfully transmitted messages may affect the actual price of the service.

Also, since the 200OK message sent in respect of each outgoing SIP message includes the application ID APID1, the AS is able to associate each 200OK message received with the EXPLODE service that generated each outgoing SIP message. The AS is therefore able to determine whether the number of 200OK messages including the application ID APID1 is equal to the number of outgoing SIP messages generated by the associated EXPLODE service. Accordingly when the AS receives the 200OK message confirming transmission of the final SIP message which includes APID1 and the ICID for that outgoing SIP message, the AS may determine that the EXPLODE service is complete.

The required data processing functions may be provided by means of one or more data processor entities. Appropriately adapted computer program code product may be used for implementing the embodiments, when loaded to a computer, for example for generating the identities and for analyzing information.

The data processing may be provided by data processing means in the application server 5 or data processing means external to the application server.

The program code product may be stored on and provided by means of a carrier medium such as a carrier disc, card, or tape. A possibility is to download the program code product via a data network.

Embodiments of the present invention have been described with specific reference to the UMTS and GPRS systems. However, it is not limited to these systems, but can be applied to any communication system which enables the provision of services to a client.

The applicant draws attention to the fact that the present invention may include any feature or combination of features disclosed herein either implicitly or explicitly or any generalization thereof, without limitation to the scope of any of the present claims. In view of the foregoing description, it will be evident to a person skilled in the art that various modifications may be made within the scope of the invention.

What is claimed is:

1. A method for determining a charge for a communication in a communications network, the method comprising:
   (a) receiving, at a first network node of a computing device; a message from a user equipment, the message comprising a payload and addressed to a plurality of destinations, wherein the first network node and each of the plurality of destinations comprise a computing device;
   (b) sending, from the first network node of a computing device; a first message towards a destination of the plurality of destinations, the first message comprising the payload, a first charging identifier, and a second charging identifier, the first charging identifier associated with the message and the second charging identifier generated for the destination, wherein the second charging identifier corresponds to a service that generates the plurality of messages and that is performed at the first network node; and
   (c) sending a charging message to a second network node to charge an account of the user equipment, the charging message comprising the first charging identifier and the second charging identifier, wherein the second network node comprises a computing device.

2. The method of claim 1, further comprising (d) receiving, at the first network node, the first charging identifier and the second charging identifier from a third network node, wherein the third network node comprises a computing device.

3. The method of claim 2, wherein the third sec-end network node is an application server node.

4. The method of claim 2, further comprising receiving, at the first network node, the first charging identifier and the second charging identifier from the third network node for each destination of the plurality of destinations before (b).

5. The method of claim 1, wherein the second network node is a charging gateway node or an online charging system.

6. The method of claim 1, wherein the message is a session initiation protocol message.

7. The method of claim 1, wherein the message is requesting an EXPLODE service.

8. The method of claim 1, wherein (a)-(c) are performed at a serving call state control function node.

9. The method of claim 1, wherein the first charging identifier is an application service specific identifier.

10. The method of claim 1, wherein the second charging identifier is an Internet protocol multimedia subsystem charging identifier generated for the destination.

11. The method of claim 1, wherein (c) is performed before (b).

12. The method of claim 11, further comprising repeating (c)-(b) for each destination of the plurality of destinations.

13. The method of claim 11, further comprising:
   receiving, at the first network node, a confirmation message from the destination confirming receipt of the first message; and
   sending, from the first network node, a second charging message to the second network node to charge the account of the user equipment, the second charging message comprising the first charging identifier and the second charging identifier.

14. The method of claim 1, wherein the message further comprises an Internet protocol multimedia subsystem charging identifier.

15. The method of claim 14, wherein the message is received from a proxy call state control function node and the Internet protocol multimedia subsystem charging identifier is generated by the proxy call state control function node.

16. The method of claim 1, further comprising receiving the first message from a third network node.

17. The method of claim 1, further comprising receiving a confirmation message from the destination confirming receipt of the first message.

18. The method of claim 17, wherein the confirmation message is received before (c).

19. The method of claim 18, further comprising repeating (b)-(c) for each destination of the plurality of destinations and sending, from the first network node, a second charging message to the second network node to charge the account of the user equipment, the second charging message comprising the first charging identifier.

20. A network node comprising:
   a processor; and
   a computer-readable medium having instructions stored thereon that, if executed by the processor, cause the processor to implement:
      a first communication interface configured to receive a message from a user equipment, the message comprising a payload and addressed to a plurality of destinations;
      a second communication interface configured to send a first message towards a destination of the plurality of destinations, the first message comprising the payload, a first charging identifier, and a second charging identifier, the first charging identifier associated with the message and the second charging identifier generated for the destination, wherein the second charging identifier corresponds to a service that generates the plurality of messages and that is performed at the first network node; and
      a third communication interface configured to send a charging message to a network node to charge an account of the user equipment, the charging message comprising the first charging identifier and the second charging identifier.

21. The network node of claim 20, wherein the network node is a serving call state control function node.

* * * * *

UNITED STATES PATENT AND TRADEMARK OFFICE
CERTIFICATE OF CORRECTION

PATENT NO. : 8,086,545 B2  
APPLICATION NO. : 12/427990  
DATED : December 27, 2011  
INVENTOR(S) : Vallinen et al.

Page 1 of 2

It is certified that error appears in the above-identified patent and that said Letters Patent is hereby corrected as shown below:

On the Face Page, in Field (75), under "Inventors", in Column 1, Line 2, delete "Hameenlinna (FI)" and insert -- Hämeenlinna (FI) --, therefor.

In Column 2, Lines 62-63, "delete "GGSN (gateway support node)" and insert -- GGSN (gateway GPRS support node) --, therefor.

In Column 3, Line 34, delete "2 and 3" and insert -- S2 and S3 --, therefor.

In Column 3, Line 42, delete "2" and insert -- S2 --, therefor.

In Column 3, Line 55, delete "54," and insert -- S4, --, therefor.

In Column 3, Line 65, delete "2" and insert -- S2 --, therefor.

In Column 4, Line 5, delete "6." and insert -- S6. --, therefor.

In Column 4, Line 12, delete "8," and insert -- S8, --, therefor.

In Column 4, Line 14, delete "2" and insert -- S2 --, therefor.

In Column 4, Line 16, delete "9," and insert -- S9, --, therefor.

In Column 4, Line 20, delete "10" and insert -- S10 --, therefor.

In Column 4, Line 51, delete "s13," and insert -- S13, --, therefor.

In Column 4, Line 66, delete "s16," and insert -- S16, --, therefor.

In Column 5, Line 55, delete "26," and insert -- S26, --, therefor.

Signed and Sealed this  
Fourteenth Day of August, 2012

David J. Kappos  
*Director of the United States Patent and Trademark Office*

CERTIFICATE OF CORRECTION (continued)
U.S. Pat. No. 8,086,545 B2

In Column 6, Line 29, delete "22," and insert -- S22, --, therefor.

In Column 7, Line 44, delete "S-SCF" and insert -- S-CSCF --, therefor.

In Column 8, Line 33, delete "a ACR" and insert -- an ACR --, therefor.

In Column 9, Line 21, in Claim 1, delete "device;" and insert -- device, --, therefor.

In Column 9, Line 27, in Claim 1, delete "device;" and insert -- device, --, therefor.

In Column 9, Line 46, in Claim 3, delete "third sec-end" and insert -- third --, therefor.